United States Patent Office

2,883,359
Patented Apr. 21, 1959

2,883,359

SYNTHETIC PRODUCTS OF HIGH MOLECULAR WEIGHT

Karl E. Müller, Leverkusen, Germany, assignor to Farbenfabriken Bayer Atkiengesellschaft, Leverkusen, Germany, a corporation of Germany No Drawing. Application April 21, 1954
Serial No. 424,760

Claims priority, application Germany April 23, 1953

5 Claims. (Cl. 260—45.4)

This invention relates to synthetic polymeric products of high molecular weight and to a process for their production. The purpose of this invention is to provide an improved process for the production of diisocyanate-modified polyesters which can be handled in the liquid phase.

It is known to produce cross-linked polymeric products by reacting linear polyesters containing hydroxyl end groups with a quantity of organic diisocyanates in excess of the amount required to react with the hydroxyl groups. In this reaction the polyester chains become linked by urethane groups to form linear compounds containing free isocyanate end groups. The molecular weight of these linear isocyanate-modified polyesters increases as the excess of diisocyanate over the quantity required for reaction with the hydroxyl groups decreases, or vice versa. The isocyanate-modified polyesters thus obtained can be converted to high grade cross-linked products according to the process described in our copending application Ser. No. 70,598, filed January 12, 1949, by Karl Erwin Müller, Hans-Frank Piepenbrink, Friedrich Wilhelm Schmidt and Erwin Weinbrenner and which has now become abandoned. This process consists in reacting the isocyanate-modified polyesters with glycols, whereby the polyester chains are linked by urethane groups and thus increased in length, and then further isocyanate groups react with the hydrogen atoms of these resultant urethane groups to give cross-linking in the molecule. This reaction can be accelerated by the addition of tertiary bases, such as hexahydrodimethyl aniline, or retarded by the addition of acids. Since the tertiary bases do not contain functional groups they are present in the resultant product as plasticizers and can be extracted therefrom, for instance by means of solvents.

In accordance with the invention it has been found that the velocity of the afore-described reaction of the isocyanate-modified polyesters can be controlled and glycols which are adapted to accelerate or delay this reaction. The reaction is accelerated by glycols containing a tertiary nitrogen atom, which are of basic nature to a larger or smaller extent. In order to obtain products with good mechanical properties, glycols of weakly basic character, which are obtainable by known methods by reacting two mols of ethylene oxide and 1 mol of an aromatic amine, have proved to be particularly suitable according to the invention.

Suitable amines for the herein described process are dihydroxyethyl aniline, substitution products thereof, and dihydroxyethyl naphthylamine; examples of compounds having a stronger basic nature are dihydroxyethyl cyclohexylamine and methyl diethanolamine.

Products containing groups which delay the reaction of the isocyanate-modified polyesters are glycols containing halogen-, cyano- or nitro-groups. As examples may be mentioned α- or β-chlorohydrin, and the glycols containing nitro groups which are obtained by the reaction of formaldehyde with hydrocarbons containing nitro groups. These glycols which are incorporated into the molecule to exert an accelerating or retarding action on the above-said reaction can also be employed in mixture or in combination with unsubstituted glycols, for instance butane diol, quinitol or diethylene glycol. It is possible to control and vary the mechanical properties of the final products substantially by using appropriate combinations of glycols. The reaction according to the invention proceeds, as does the above-described known process, without the evolution of carbon dioxide, and can therefore be conducted in the liquid phase.

The process of the invention can be carried out by reacting the above-defined glycols with the isocyanate-modified polyesters. The quantitative proportions of the reactants are preferably so chosen that the NCO-groups remain in slight excess, by using an amount of the glycols slightly less than the stoichiometrical proportion.

According to another embodiment of the invention the glycols are incorporated into the polyester by stirring and reacted with the diisocyanates in a second stage. In this embodiment the components are again employed in the above-said quantitative proportions. The cross-linking can then take place while the mixture is being moulded.

Alternatively, the glycols are employed in a proportion equivalent to the isocyanate groups present in the isocyanate-modified polyester and 1–5% of a diisocyanate incorporated into the linear compounds so obtained prior to moulding.

Suitable diisocyanates for the process of the invention are for instance diphenylmethane diisocyanate, 1,5-naphthalene diisocyanate and p-phenyl diisocyanate.

The preferred linear polyesters employed as starting materials are those prepared from substantially saturated aliphatic products. Suitable acid components are adipic acid, succinic acid, sebacic acid and thiodipropionic acid. The polyester may have incorporated therein smaller proportions of aromatic dicarboxylic acids, for instance phthalic acid. Suitable glycol components of the polyesters are for instance ethylene glycol, 1,4-butylene glycol, and diethylene glycol. Care must be taken that, owing to a slight excess of glycols and to sufficiently long heating, the polyester has practically no acid value. The OH-value must be between about 20 and about 80, preferably between 40 and 60. That corresponds to a percentage of OH-groups of 0.6–2.4, preferably 1.2–1.8 by weight. Other bifunctional components may be added in minor quantities to replace part of the said dicarboxylic acids and glycols. Examples of such components are diamines, hydroxyamines and glycols, which contain groups which are capable of accelerating or retarding the reaction of the isocyanate-modified polyester.

The present invention is further illustrated by the following examples.

*Example 1*

1 kilogram of a glycol adipic acid ester of hydroxyl number 55 and acid number 1 is dehydrated at 120–130° C. under 12 millimeter pressure, and 170 grams of 1,5-naphthylene diisocyanate are introduced with stirring, the temperature rising to 138° C. After cooling the melt to 130° C., 51.5 grams of dihydroxyethyl-α-naphthylamine are introduced with stirring, and the mixture is cast into moulds and heated to 100° C. for 35 hours. A highly elastic material with the following properties is obtained:

| | |
|---|---:|
| Tensile strength _____ kg./cm.$^2$__ | 252 |
| Elongation at break _____ percent__ | 755 |
| Permanent set _____ do____ | 5 |
| Tear resistance _____ do____ | 33 |
| Resilience _____ | 43/61 |
| Hardness _____ | 55 |
| Load at 300% elongation _____ | 21 |

Example 2

The same starting materials and proportions as in Example 1 are used, but the dihydroxy-ethyl-α-naphthylamine is introduced with stirring into the dehydrated polyester, and the 1,5-naphthylene diisocyanate is reacted in a second stage. A highly elastic material with the following properties is obtained:

| | |
|---|---|
| Tensile strength _____ kg./cm.² | 290 |
| Elongation at break _____ percent | 760 |
| Permanent set _____ do | 4 |
| Tear resistance _____ | 26 |
| Resilience _____ | 38/52 |
| Hardness _____ | 58 |
| Load at 300% elongation _____ | 22 |

Example 3

2 kilograms of a glycol adipic acid polyester of hydroxyl number 56 are dehydrated, and 274 grams of 1,5-naphthylene diisocyanate added with stirring. After the temperature of the melt has dropped from 140° C. to 130° C., 80 grams of dihydroxyethyl-α-naphthylamine (this quantity is equivalent to that of the diisocyanate groups) are added with stirring, and the mixture is made into a sheet on the roller after condensation at 100° C. 100 grams of 1,5-naphthylene diisocyanate are incorporated on the roller, and a sheet is obtained which gives excellent, highly elastic plates with good mechanical properties after pressing.

Example 4

To 1 kilogram of a dehydrated glycol adipic acid polyester of hydroxyl number 56 and acid number 1 are added with stirring at 130° C. 170 grams of 1,5-naphthylene diisocyanate. After the temperature has dropped to 130° C. a mixture of 15 grams of butanediol and 10 grams of dihydroxyethyl cyclohexylamine is added with stirring. By casting the melt into moulds and heating at 100° C. for 24 hours a highly elastic material with the following properties is obtained:

| | |
|---|---|
| Tensile strength _____ kg./cm.² | 239 |
| Elongation at break _____ percent | 565 |
| Permanent set _____ do | 7 |
| Tear resistance _____ do | 22 |
| Resilience _____ | 48/64 |
| Hardness _____ | 74 |
| Load at 300% elongation _____ | 57 |

Example 5

200 grams of a glycol adipic acid polyester of hydroxyl number 56 are dehydrated and reacted with 34 grams of 1,5-naphthylene diisocyanate. After the temperature has dropped to 130° C., 5 grams of α-chlorohydrin are added. The melt is cast into moulds and heated to 100° C. for 48 hours. The material thus obtained has the following mechanical properties:

| | |
|---|---|
| Tensile strength _____ kg./cm.² | 277 |
| Elongation at break _____ percent | 720 |
| Permanent set _____ do | 13 |
| Tear resistance _____ do | 23 |
| Resilience _____ | 46/48 |
| Hardness _____ | 60/61 |
| Load at 300% elongation _____ | 31 |

When the α-chlorohydrin in the above reaction is replaced by 6.6 grams of 2-nitroethyl-1,3-propanediol of the following formula:

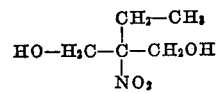

the other quantitative proportions remaining the same, a product with similar mechanical properties is obtained.

I claim:

1. In a process of forming a high molecular weight cross-linked polymer by reacting an organic diisocyanate with a cross-linking glycol and an anhydrous organic linear polyester having from 0.6–2.4% by weight of hydroxyl groups and an acid value substantially not exceeding 1, said polyester being prepared substantially from an aliphatic dicarboxylic acid and an aliphatic glycol, the improvement comprising employing as the cross-linking glycol in the formation of said cross-linked product one which will accelerate the cross-linking reaction, said glycol containing a tertiary nitrogen atom and being selected from the group consisting of dihydroxyethyl aniline, dihydroxyethyl naphthylamine, dihydroxyethyl cyclohexylamine, and methyl diethanolamine.

2. Process of claim 1 wherein the cross-linking glycol is stirred into the polyester, and the organic diisocyanate is reacted in a second stage.

3. A process for the production of a high molecular weight cross-linked polymer which comprises reacting an anhydrous organic linear polyester having from 0.6–2.4% by weight of hydroxyl groups and an acid value substantially not exceeding 1, said polyester being prepared substantially from a saturated aliphatic dicarboxylic acid and an aliphatic glycol, with an organic diisocyanate in stoichiometric excess of the quantity required to react with the end groups of the polyester, and then reacting the resulting isocyanate-modified polyester with a glycol containing a tertiary nitrogen atom and selected from the group consisting of dihydroxyethyl aniline, dihydroxyethyl naphthylamine, dihydroxyethyl cyclohexylamine, and methyl diethanolamine, said glycol having the property of functioning as an accelerator for the cross-linking reaction, the resulting cross-linked polymer being free from the disagreeable odor characteristic of free tertiary amines.

4. Process of claim 3 wherein the glycol is employed in an amount slightly less than the stoichiometric proportion required to react with the —NCO groups of the diisocyanate-modified polyester.

5. Process of claim 3 wherein the diisocyanate is 1,5-naphthylene diisocyanate and the cross-linking glycol is dihydroxyethyl naphthylamine.

References Cited in the file of this patent

UNITED STATES PATENTS

| | | |
|---|---|---|
| 2,621,166 | Schmidt et al. | Dec. 9, 1952 |
| 2,729,618 | Muller | Jan. 3, 1956 |